US012652190B2

(12) United States Patent
Handolescu et al.

(10) Patent No.: US 12,652,190 B2
(45) Date of Patent: Jun. 9, 2026

(54) MECHANISMS OF IMPROVING FIRMWARE MANAGEMENT PERFORMANCE AND CONTROL OF CMIS TRANSCEIVERS DURING SUCH OPERATIONS

(71) Applicant: ARISTA NETWORKS, INC., Santa Clara, CA (US)

(72) Inventors: Radu Handolescu, San Jose, CA (US); Alex Volinsky, Campbell, CA (US); Aditya Bhiday, Sunnyvale, CA (US); Brian Schuette, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 316 days.

(21) Appl. No.: 18/345,513

(22) Filed: Jun. 30, 2023

(65) Prior Publication Data

US 2025/0007751 A1     Jan. 2, 2025

(51) Int. Cl.
H04L 12/403          (2006.01)

(52) U.S. Cl.
CPC ................................. H04L 12/403 (2013.01)

(58) Field of Classification Search
CPC ..... H04L 12/403; H04L 41/082; H04L 41/34; H04L 41/342; H04L 41/344; H04L 43/103
See application file for complete search history.

(56) References Cited

U.S. PATENT DOCUMENTS

| | | | | |
|---|---|---|---|---|
| 5,566,388 A | * | 10/1996 | Brame | ................. H04W 84/08 |
| | | | | 370/340 |
| 8,943,490 B1 | * | 1/2015 | Jain | ........................... G06F 8/65 |
| | | | | 717/172 |
| 9,632,850 B1 | * | 4/2017 | Emam | ..................... H04L 47/58 |
| 2002/0116490 A1 | * | 8/2002 | Hogg | ................... H04L 41/046 |
| | | | | 709/224 |
| 2004/0148379 A1 | * | 7/2004 | Ogura | ................. H04L 67/2871 |
| | | | | 340/4.32 |
| 2004/0179524 A1 | * | 9/2004 | Sasagawa | ............... H04L 45/18 |
| | | | | 370/389 |

(Continued)

OTHER PUBLICATIONS

"System Management Bus (SMBus) Specification" Version 3.2, Jan. 12, 2022; System Management Interface Forum, Inc. (Year: 2022).*

*Primary Examiner* — Stephen J Clawson
(74) *Attorney, Agent, or Firm* — Sprinkle IP Law Group

(57) ABSTRACT

Systems and methods for improving performance of operations on management buses in network devices during communication-intensive operations, where a transceiver manager monitors the transceivers to determine when a communication-intensive operation has been initiated. The transceiver manager then determines which transceivers on the same SMBus are not involved in the communication-intensive operation and it reduces the polling rate for these other transceivers. When the communication-intensive operation has completed, the transceiver manager resets the polling rate for the transceivers. During the pendency of the communication-intensive operation, the transceiver manager may determine that a management operation has been issued for the transceivers undergoing the communication-intensive operation, in which case the communication-intensive operation is paused to allow completion of the management operation and then resumed.

17 Claims, 7 Drawing Sheets

(56)  References Cited

U.S. PATENT DOCUMENTS

| | | | | |
|---|---|---|---|---|
| 2004/0243994 | A1* | 12/2004 | Nasu | G06F 8/65 |
| | | | | 717/171 |
| 2007/0177523 | A1* | 8/2007 | Nagami | H04L 41/0631 |
| | | | | 370/242 |
| 2012/0023236 | A1* | 1/2012 | Backholm | H04W 28/14 |
| | | | | 709/226 |
| 2012/0272084 | A1* | 10/2012 | Tsuji | G06F 1/3284 |
| | | | | 713/324 |
| 2013/0205289 | A1* | 8/2013 | Unno | G06F 8/65 |
| | | | | 717/171 |
| 2014/0289436 | A1* | 9/2014 | Lewis | G06F 13/24 |
| | | | | 710/260 |
| 2015/0263907 | A1* | 9/2015 | Negishi | H04L 69/40 |
| | | | | 709/223 |
| 2017/0149950 | A1* | 5/2017 | Wakita | H04W 12/12 |
| 2018/0270137 | A1* | 9/2018 | Ganster | H04L 12/2803 |
| 2020/0092129 | A1* | 3/2020 | Lin | H04L 12/4625 |
| 2021/0243049 | A1* | 8/2021 | Kuwata | H04W 4/24 |
| 2024/0211306 | A1* | 6/2024 | Saha | H04L 69/28 |
| 2024/0223649 | A1* | 7/2024 | Hwang | H04L 67/1008 |
| 2024/0414051 | A1* | 12/2024 | Bienenfeld | H04L 63/20 |

* cited by examiner

MECHANISMS OF IMPROVING FIRMWARE MANAGEMENT PERFORMANCE AND CONTROL OF CMIS TRANSCEIVERS DURING SUCH OPERATIONS

TECHNICAL FIELD

The disclosed embodiments relate generally to network devices and more particularly to systems and methods for controlling management communications for transceivers in the network device which are carried via a system management bus.

BACKGROUND

The CMIS (Common Management Interface Specification) standard specifies a mechanism implemented in a network device for managing (e.g., upgrading) firmware of transceivers in the network device via a system management bus (SMBus). The SMBus is a simple two-wire bus that is used for low-speed system management communications between devices that are installed on a motherboard of the network device. The SMBus carries traffic for transceiver management and monitoring, and also carries data traffic for firmware upgrades to the transceivers.

Firmware updates to transceivers typically require the transfer of a large amount of data and the upgrades can take a substantial amount of time to complete. A firmware upgrade to a transceiver can, for example, take 10 minutes or more. Because of the large amount of data required for firmware upgrades and the large amount of time required to convey these upgrades to transceivers in the network device, firmware updates can severely reduce the availability of the SMBus for use in handling the other transactions that are carried on the SMBus (e.g., management and monitoring transactions), and can therefore substantially reduce the performance of the functions that are based on these transactions.

Some conventional systems attempt to reduce the negative impact of firmware upgrades on the performance of management and monitoring transactions on the SMBus by completing the firmware upgrades as quickly as possible. This is accomplished by preventing the SMBus connected to the transceiver being upgraded from carrying any of the management and monitoring transactions for the transceivers that are not receiving the firmware upgrade during the pendency of the upgrade.

This solution causes other problems, however, because the transceivers are normally monitored on a cycle of several (e.g., 2-6) seconds, so suspending the monitoring of the transceivers for the duration of a firmware upgrade (e.g., 10 minutes) can cause hundreds of cycles of monitoring data to be missed. This conventional solution may also prevent configuration changes from being made to the transceivers whose transactions are suspended. This is unacceptable.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
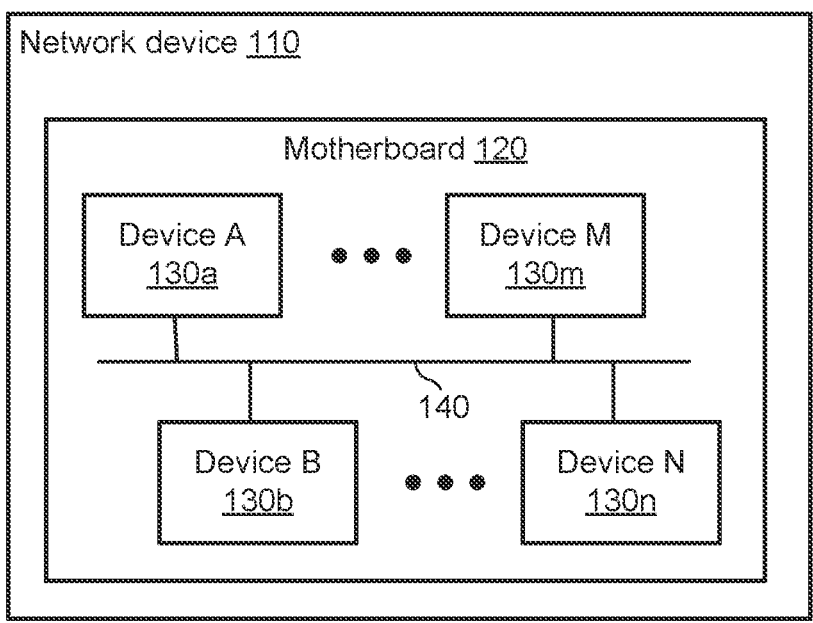
FIG. 1 is a diagram illustrating the interconnection of components of a network device by an SMBus in accordance with some embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments disclosed herein reduce the negative impact resulting from carrying firmware upgrades and other communication-intensive operations over the SMBus. These embodiments also reduce the adverse effects of conventional solutions to these problems. In the disclosed embodiments, a transceiver management component of the network device monitors the transceivers in the device to determine when a command for a SMBus-communication-intensive operation has been initiated. The transceiver management component then determines which transceivers on the same SMBus are not involved in the communication-intensive operation and reduces the polling rate for these other transceivers.

By reducing the polling rate for the transceivers that are not involved in the communication-intensive operation, the amount of bandwidth used for monitoring and management transactions on the SMBus is reduced. This allows the communication-intensive operation on the SMBus to complete more quickly than if the transceivers were polled at the normal rate. Because the polling does continue, however, management data can still be obtained from the transceivers (albeit less frequently) during the SMBus-communication-intensive operation. Configuration changes and other management transactions can also be completed, so the transceivers do not remain unmanaged for the duration of the communication-intensive operation.

Some of the disclosed embodiments also monitor the transceiver which is undergoing the communication-intensive operation (e.g., firmware upgrade) to determine when a configuration command for this transceiver is applied. In response to detecting such a configuration command, the communication-intensive operation is temporarily paused so that the configuration command can be applied to the transceiver. When application of the configuration command has been completed, the firmware upgrade is resumed.

The communication-intensive operation may also be paused if it is determined that the monitorable data of the transceiver has not been updated for a predetermined amount of time. In this case, firmware upgrade is temporarily paused, the monitorable data is obtained from the transceiver and the corresponding data in the transceiver management component is updated, and then the communication-intensive operation is resumed. Because the firmware upgrade is paused for these events, the transceiver management component of the network device can continue to manage and monitor the transceiver during the communication-intensive operation.

Referring to FIG. 1, a diagram illustrating the interconnection of components of a network device by an SMBus is shown. In this figure, a network device 110 includes a motherboard 120 having a set of device components 130 installed thereon. Each of device components 130 is connected to an SMBus 140.

It should be noted that different instances of the same or similar devices may be identified herein by a common reference number followed by a letter. For instance, as depicted in FIG. 1, the network device includes device components 130a-130n. The individual device components may be referred to collectively by the number alone (e.g., device components 130).

The depicted set of device components 130 may be a subset of the components that are contained in network device 110 and/or motherboard 120. Network device 110 and/or motherboard 120 may include other device components which are not connected to SMBus 140. These additional device components are not depicted here because they are not relevant to the embodiments disclosed herein.

SMBus 140 is a simple two-wire bus which is used primarily for the purpose of lightweight communications between devices on motherboard 120. The SMBus protocol is an extension of the Inter-Integrated Circuit (I2C) serial communication protocol and uses typical speeds of 400 KHz and 1 MHz. The limited bandwidth of SMBus 140 must be shared by all of the devices that are connected to it, but this bandwidth is normally sufficient for the intended lightweight communications. There may be more than a single SMBus connected between different subsets of the device components.

Figure 2:
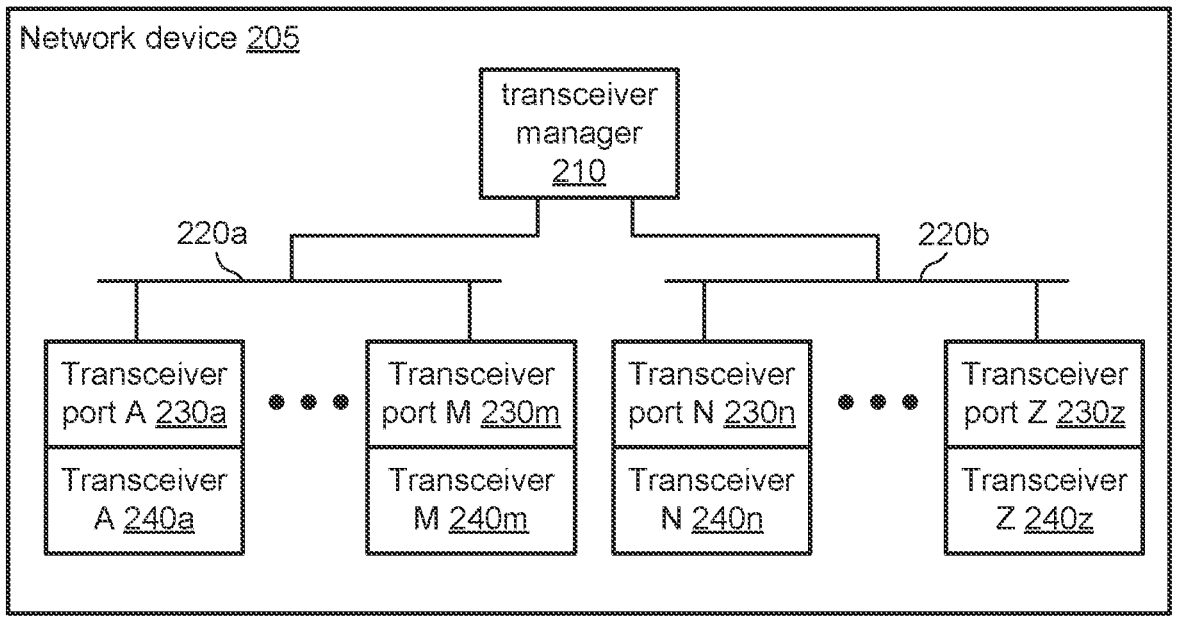
FIG. 2 is a diagram illustrating the interconnection of multiple transceivers to a transceiver management device in accordance with some embodiments.

Referring to FIG. 2, a diagram is shown to illustrate the interconnection of multiple transceivers to a transceiver management device in accordance with some embodiments. In this example, a transceiver management component 210 of a network device 205 is connected to a plurality of separate SMBuses 220. Each SMBus 220 is also connected to a corresponding set of transceiver ports 230 of the network device. For example, SMBus 220a has the subset of transceiver ports including ports 230a-230m connected to it, while SMBus 220b has the subset of transceiver ports including ports 230n-230z connected to it. Each of transceiver ports 230 may have a corresponding transceiver 240 which is installed in the port.

When a data transaction involving one of the transceivers is carried out, the SMBus to which the transceiver is connected is busy, and is unavailable to carry other transactions involving the other transceivers. Most of the transactions involving the transceivers consist of monitoring or management transactions which are relatively short in duration, and each occupies the SMBus for a very small amount of time.

The transceiver management component can therefore sequentially poll each of the transceivers connected to the SMBus to obtain monitoring data for the transceivers without exceeding the limited bandwidth of the SMBus. Typically, the transceiver management component will poll each of the transceivers for monitoring data every 2-6 seconds. Like the monitoring operations, most management operations conducted on the transceivers require the transfer of a relatively small amount of data, so the transceiver management component can conduct management operations for each of the transceivers connected to the SMBus without difficulty using the limited amount of available bandwidth on the SMBus.

In addition to these monitoring and management operations that are conducted via the SMBus, the transceiver management component may be required to conduct operations with respect to the transceivers which are much more communication-intensive. The Common Management Interface Specification (CMIS revision 4.0) specifies a mechanism for managing firmware that includes making upgrades to compliant transceivers without having to remove the transceivers from the corresponding transceiver ports. These firmware upgrades are performed via the SMBus, but require substantially more bandwidth than the typical lightweight communications that are carried out via the SMBus.

Originally, data transfers which were carried on the SMBus for firmware upgrades and other communication-intensive operations were interspersed with data transfers associated with the typical lightweight communications for monitoring and management operations. This is illustrated in the transaction diagram of FIG. 3. This diagram shows the transactions between a set of transceivers (transceiver A, transceiver B and transceiver N), and a transceiver management component of the network device.

Figure 3:
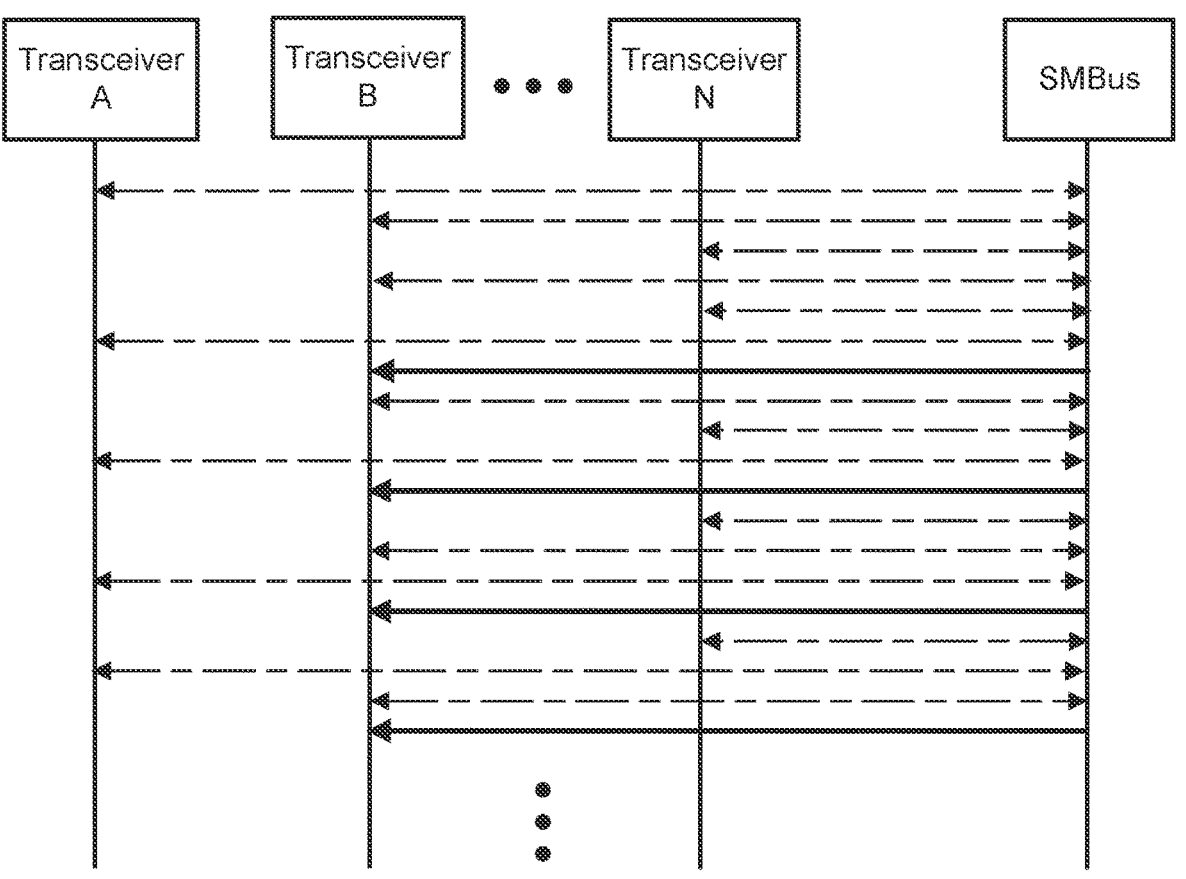
FIG. 3 is a transaction diagram illustrating completion of a communication-intensive operation while monitoring and management operations are conducted at a normal rate in accordance with the prior art.

In FIG. 3, monitoring and management transactions occur between each of the transceivers and the management component. These transactions occur on a normal cycle, which in a typical network device may be every 2-6 seconds. Each of these transactions is represented in the figure by a dashed, double ended arrow, which indicates that the data transmitted over the bus may be bidirectional (e.g., the management component polling the transceiver and the transceiver providing responsive data), or unidirectional (e.g., the management component transmitting a command or configuration data to the transceiver).

In this example, it is assumed that a communication-intensive operation such as a firmware upgrade is initiated with respect to a particular one of the transceivers-transceiver B. The firmware upgrade is accomplished by transmitting the upgrade from the transceiver management component to transceiver B in parts. Each of the individual parts is transmitted via the SMBus using the available bandwidth, but without affecting the normal monitoring and management transactions. Thus, the individual parts of the communication-intensive operation are interspersed with the normal monitoring and management transactions.

Because the communication-intensive operation requires the transfer of a large amount of data over the SMBus, many smaller individual transactions are required to transfer all of the associated data from the transceiver management component to the transceiver. Since the partial transactions of the communication-intensive operation are spread out and communicated between the monitoring and management transactions, it may take a great deal of time (e.g., 20-30 minutes) to complete the communication-intensive operation. This amount of time is unacceptably long.

Figure 4:
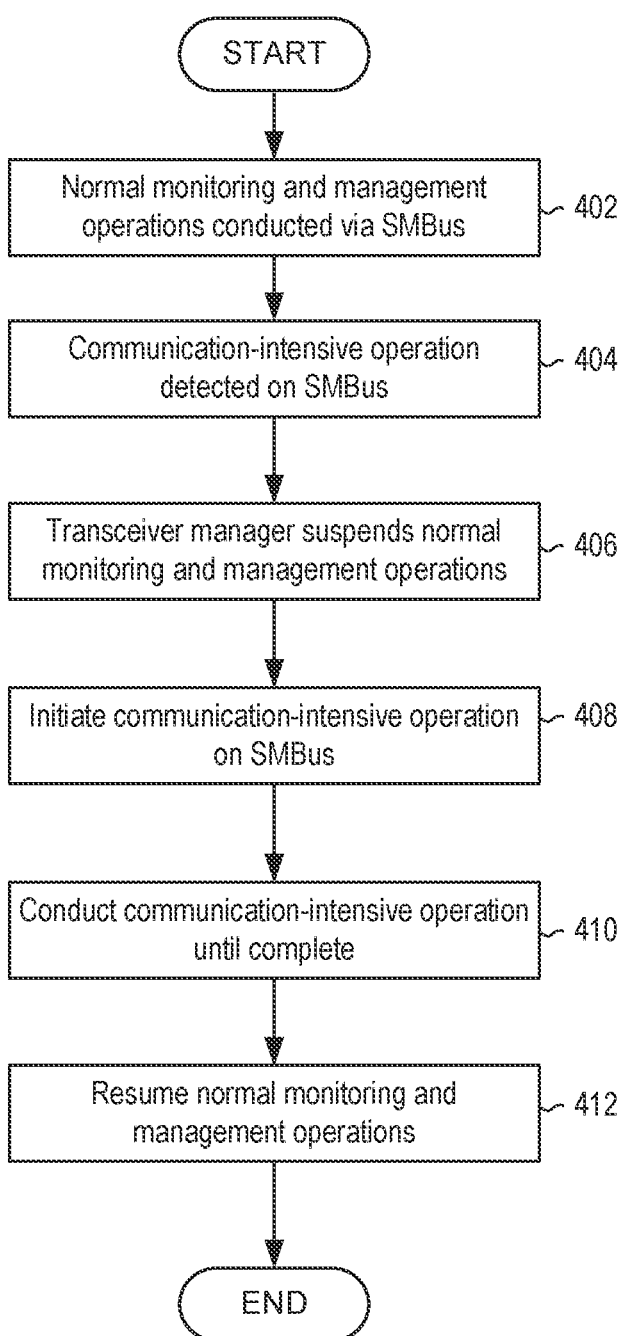
FIG. 4 is a flow diagram illustrating a method in which normal monitoring and management operations are suspended during a communication-intensive operation in accordance with the prior art.

In some existing systems, this problem is addressed by suspending the normal monitoring and management transactions on the SMBus while the communication-intensive operation is pending. This may be implemented, for example, in a method such as depicted in the flow diagram of FIG. 4. In this figure, the normal monitoring and management operations are carried via the SMBus (step 402). When a communication-intensive operation such as a firmware upgrade is detected (step 404), the transceiver management component suspends the normal monitoring and management operations (step 406) and initiates the communication-intensive operation (step 408). The transceiver management component then continues to perform the communication-intensive operation until this operation is complete (step 410). After the transceiver management component has completed the communication-intensive operation, it resumes conducting the normal monitoring and management operations over the SMBus (step 412).

Figure 5:
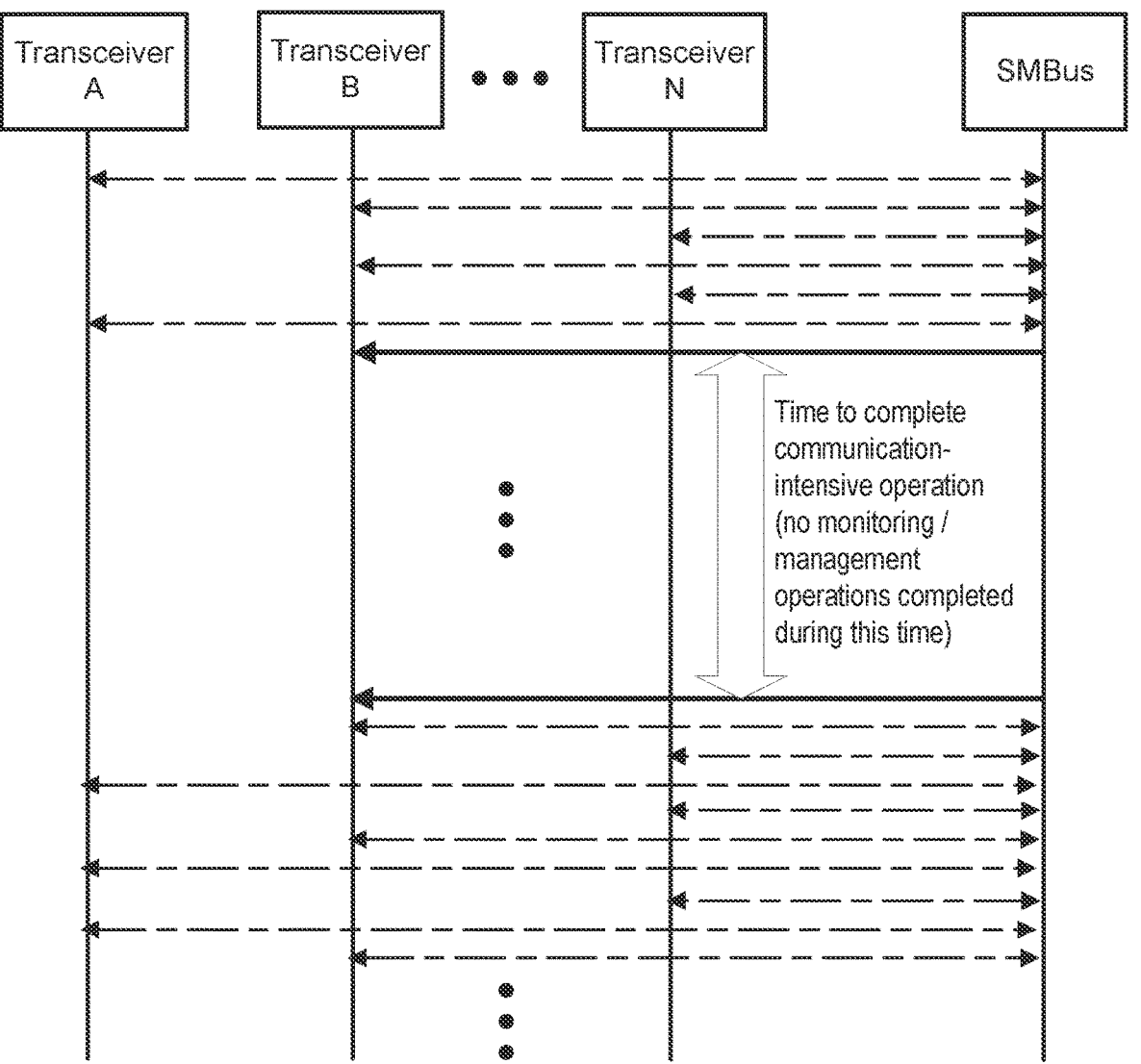
FIG. 5 is a transaction diagram illustrating a method in which monitoring and management operations are suspended during a communication-intensive operation in accordance with the prior art.

A transaction diagram illustrating this prior art solution is illustrated in FIG. 5. In this figure, normal monitoring and management transactions are carried out between each of the transceivers and the transceiver management component, as represented by the bidirectional arrows. The transaction(s) between the transceiver management component and transceiver B are represented by the two unidirectional arrows from the management component to the transceiver representing the beginning and end of the operation. It should be noted that the communication-intensive operation may be carried over the SMBus in multiple individual transactions, or as a single larger transaction.

As depicted in FIG. 5, typical monitoring and management transactions are initially carried out between the transceiver management component and each of the transceivers. When a communication-intensive operation is initiated, these normal monitoring and management transactions are suspended, and the transaction (or transactions) necessary to complete the communication-intensive operation is performed. During the pendency of the communication-intensive operation, none of the normal monitoring and management transactions to the other transceivers are performed.

Because the communication-intensive operation is able to utilize the entire bandwidth of the SMBus, the operation can be completed relatively quickly. For instance, a communication-intensive operation comparable to the one performed in FIG. 3 may be completed in about 10 minutes, as compared to 20-30 minutes in the scenario of FIG. 3. While this resolves the problem of the unacceptably long amount of time required to complete the communication-intensive operation itself, it creates a new problem. Specifically, because the typical monitoring and management transactions are suspended during the entirety of the communication-intensive operation, many cycles of these transactions will be skipped, and the transceivers will go unmonitored and unmanaged for an unacceptably long time. For example, if the typical transaction cycle is 2-6 seconds and the communication-intensive operation takes 10 minutes to complete, potentially hundreds of cycles of monitoring and management transactions will be missed.

In regard to the problems of taking too long to complete the communication-intensive operation (as illustrated in FIG. 3) and suspending normal monitoring and management operations for too long (as illustrated in FIG. 5), the embodiments disclosed herein continue to perform the normal monitoring and management operations during the pendency of a communication-intensive operation, but the monitoring and management operations are performed with a reduced frequency. Because these operations are performed at a reduced frequency, they do not cause as many interruptions to the communication-intensive operation as in the scenario of FIG. 3, so the communication-intensive operation is able to complete in a much shorter amount of time. For instance, rather than requiring 20 to 30 minutes to complete, the operation may take about 12 minutes. This is only about 20 percent longer than if the operation were completed with the monitoring and management operations suspended (about 10 minutes).

Figure 6:
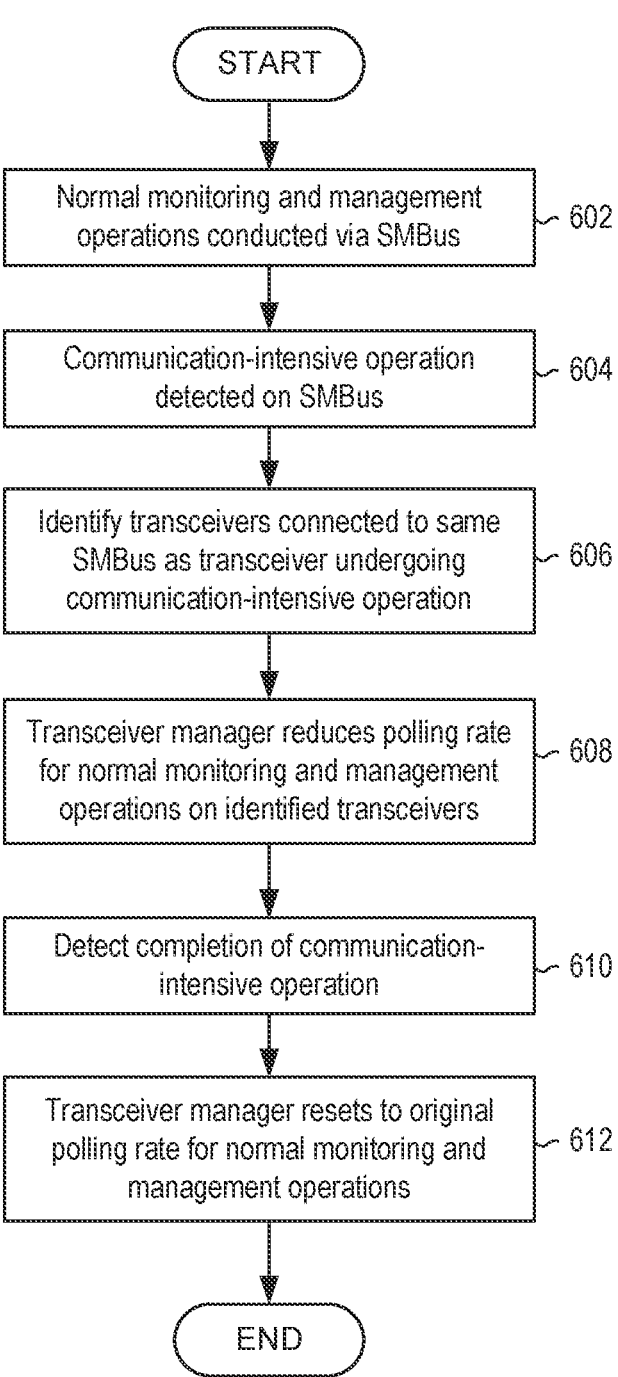
FIG. 6 is a flow diagram illustrating a method for reducing a polling rate for monitoring and management operations during a communication-intensive operation in accordance with some embodiments.

A method in accordance with one embodiment is illustrated in FIG. 6. In this method, a transceiver manager for a network device is initially carrying out normal monitoring and management operations corresponding to transceiver ports connected to an SMBus (step 602). These operations are performed with an initial polling frequency which may be, for example, 2-6 seconds, although this may vary from one embodiment to another.

The transceiver manager then determines that a first one of the transceiver ports in the network device is undergoing a communication-intensive operation such as a firmware upgrade (step 604). For instance, the transceiver manager may have detected a message initiating a communication-intensive operation. In some cases, the transceiver manager may be responsible for initiating and/or performing the communication- intensive operation.

In response to determining that the first transceiver port is undergoing a communication-intensive operation, the transceiver manager identifies transceiver ports which are connected to the same SMBus as the first transceiver port (606). The transceiver manager then reduces the polling frequency for each of the transceiver ports on the SMBus rather than the first transceiver port (step 608). The polling frequency may, for example, be reduced from about 2-6 seconds to about 6-20 seconds per polling cycle.

When the transceiver manager determines that the communication-intensive operation has completed (step 610), the transaction manager resets the polling frequency of each of the transceiver ports that were not involved in the communication-intensive operation from the reduced polling frequency (e.g., 6-20 seconds) to the original polling frequency (e.g., 2-6 seconds) (step 612).

In some embodiments, the transceiver manager may be configured to adjust the polling frequency that is used for the transceiver ports other than the first transceiver port during the pendency of the communication-intensive operation. In these embodiments, for example, upon determining that a communication-intensive operation is being conducted for the first transceiver port, the transceiver manager may initially reduce the polling frequency of the other transceiver ports and then monitor one or more parameters associated with the polling of these transceiver ports and/or the communication-intensive operation. Based upon the parameters monitored by the transceiver manager, the transceiver manager may determine that the polling frequency should be adjusted. If the monitored parameters indicate that the transceiver ports should be polled more often, the transceiver manager will back off the polling frequency reduction (i.e., it may increase the polling rate). The specific algorithm implemented to determine whether or not to adjust the polling rate may vary from one embodiment to another.

It is assumed for the purposes of this example that the first transceiver port (which is undergoing the communication-intensive operation) does not have any corresponding monitoring and or management transactions which are conducted during the communication-intensive operation, so there is no need to reduce and then reset the polling frequency for this transceiver port. It is possible that some alternative embodiments could conduct such operations. In such cases, it may be desirable to reduce and later reset the polling frequency of this transceiver port in a manner similar to the other transceiver ports.

In some embodiments, if it is necessary to perform a management operation, the transceiver controller may be configured to pause or temporarily suspend the communication-intensive operation in order to perform the management operation. An example of a method that pauses a communication-intensive operation to execute a management operation is illustrated in FIG. 7.

Figure 7:
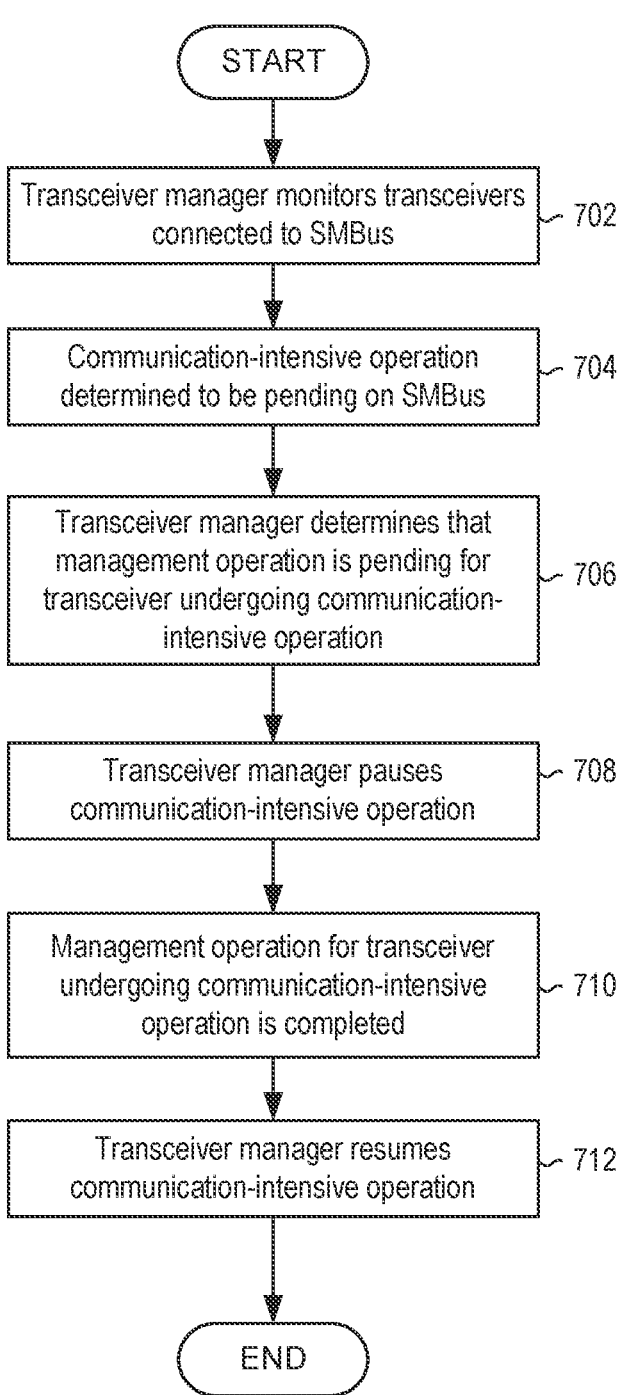
FIG. 7 is a flow diagram illustrating a method in which a communication-intensive operation is paused to conduct a management operation for the same transceiver in accordance with some embodiments.

FIG. 7 is a flow diagram illustrating an alternative method in accordance with some embodiments. In this method, a set of transceiver ports which are connected to an SMBus are monitored by a transceiver manager (step 702) and it is determined that a communication-intensive operation is being conducted on the SMBus with respect to a first one of the transceiver ports (step 704).

While the communication-intensive operation is pending, the transceiver manager determines that a management operation has been issued for the first transceiver port and is pending (step 706). In response to determining that the management operation is pending for the first transceiver port, the transceiver manager pauses the communication-intensive operation (step 708). After the communication-intensive operation has been paused, the pending management operation for the first transceiver port is conducted (step 710). Then, after the management operation has been completed, the communication-intensive operation is resumed (step 712).

Referring again to FIG. 2, the "bottleneck" which creates the need for the present embodiments is at the SMBus (220). In other words, it is the limited amount of bandwidth in SMBus 220 that limits the ability to perform monitoring and management operations on the SMBus during communication-intensive operations. There are other network devices, however, in which the SMBus itself is not the cause of the problem.

Figure 8:
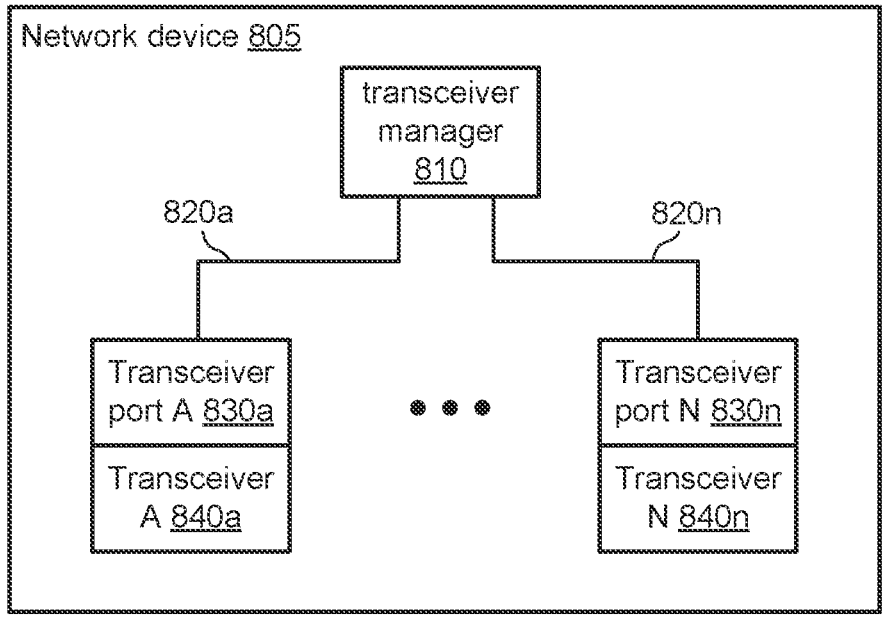
FIG. 8 is a diagram illustrating the interconnection of multiple transceivers via corresponding management buses to a transceiver management device in accordance with some embodiments.

Consider, for example, the network device illustrated in FIG. 8. In this device 805, as in the device of FIG. 2, transceiver manager 810 is connected to multiple SMBuses 820. In the device of FIG. 8, however, each SMBus 810 is connected to only a single transceiver port 830. Each transceiver port 830 in turn has a corresponding transceiver 840 connected to it.

Because each SMBus 820 is connected to only a single corresponding transceiver port 830 and transceiver 840, the performance of a communication-intensive operation corresponding to one of the transceiver ports and/or the corresponding transceiver does not reduce the amount of SMBus bandwidth that is available to other transceiver ports and transceivers. Transceiver manager 810, however, may have less processing resources available to service the other transceiver ports and transceivers when a communication-intensive operation is being conducted with respect to a first SMBus and the corresponding transceiver port and transceiver.

The network device of FIG. 8 therefore implements a variation of the methods described above to reduce the performance effects of the bottleneck in the transceiver manager. Thus, in one embodiment, the transceiver manager determines that a first one of the transceiver ports and/or the corresponding transceiver is undergoing a communication-intensive operation. In response to making this determination, the transceiver manager identifies the other transceiver ports and/or corresponding transceivers that are connected to the transceiver manager and would be affected by the consumption of the transceiver manager's resources by the communication-intensive operation.

The transceiver manager then reduces the polling frequencies for each of these other transceiver ports and/or transceivers so that less of the transceiver manager's resources are required for monitoring and management operations for those transceiver ports and/or transceivers, while allowing the operations to continue. As with the methods described above, the network device in this embodiment may be configured to adjust the polling rate that is used for these transceiver ports and/or transceivers based on the availability of the computing resources in the transceiver manager during the communication-intensive operation.

After the communication-intensive operation has been completed, the transceiver manager resets the polling frequencies at which the monitoring and management operations are conducted for the transceiver ports and/or transceivers that did not undergo the communication-intensive operation.

As with the earlier described methods, the network device of FIG. 8 may also be configured to pause the communication-intensive operation when a management operation is pending for the transceiver port and/or transceiver undergoing the communication-intensive operation. In this case, the transceiver manager determines while the communication-intensive operation is pending that a management operation for the transceiver port and/or transceiver has been initiated. The transceiver manager then pauses the communication-intensive operation so that the management operation can be conducted. When the management operation has been completed, the transceiver manager resumes the communication-intensive operation.

There may be numerous additional alternative embodiments. For example, one embodiment comprises a method for managing transceivers in a network device. In this method, it is determined that a first transceiver port of a plurality of transceiver ports is undergoing a communication-intensive operation on a first bus. In response to the determining that first transceiver port is undergoing the communication-intensive operation, a set of transceiver ports other than the first transceiver port is identified and a polling frequency for each of the transceiver ports in the set is reduced from a first polling frequency to a reduced polling frequency. It is then determined that the communication-intensive operation has completed and, in response to this determination, the polling frequency of the transceiver ports in the set is reset to the first polling frequency.

In some embodiments, the method further includes determining, during the communication-intensive operation, that a management operation for the first transceiver port is pending, pausing the communication-intensive operation, completing the management operation for the first transceiver port, and resuming the communication-intensive operation. In some embodiments, the management operation comprises a configuration command for the first transceiver port, while in others the management operation comprises an update of monitorable data for the first transceiver port.

In some embodiments, the first bus comprises a two-wire SMBus. In some embodiments, the plurality of transceiver ports includes transceiver ports connected to a plurality of different buses.

In some embodiments, the communication-intensive operation comprises a firmware upgrade.

In some embodiments, reducing the polling frequency for each of the transceiver ports comprises signaling each of the transceiver ports in the set to modify a corresponding frequency with which the transceiver port provides the monitorable data.

In an alternative embodiment, a method for managing transceivers in a network device comprises monitoring a plurality of transceiver ports, determining that a first transceiver port of the plurality of transceiver ports is undergoing a communication-intensive operation on a first bus, determining during the communication-intensive operation that a management operation for the first transceiver port is pending; pausing the communication-intensive operation, completing the management operation for the first transceiver port, and resuming the communication-intensive operation after completion of the management operation.

Another alternative embodiment comprises a network device having a management bus, a plurality of transceiver ports connected to the management bus, and a transceiver manager connected to the management bus. The transceiver manager is configured to, in response to determining that a first transceiver port of the plurality of transceiver ports is undergoing a communication-intensive operation on the management bus, identify a subset of the plurality of transceiver ports other than the first transceiver port, and reduce a polling frequency for each of the transceiver ports in the subset from a first polling frequency to a reduced polling frequency. The transceiver manager is further configured to reset the polling frequency of the transceiver ports in the subset to the first polling frequency in response to determining that the communication-intensive operation has completed.

In some embodiments, the transceiver manager is configured to determine during the communication-intensive operation that a management operation for the first transceiver port is pending, pause the communication-intensive operation, complete the management operation for the first transceiver port, and resume the communication-intensive operation after the management operation for the first transceiver port has been completed. The management operation may comprise, for example, a configuration command for the first transceiver port or an update of monitorable data for the first transceiver port.

In some embodiments, the first bus comprises a two-wire SMBus. The plurality of transceiver ports may include transceiver ports connected to a plurality of different buses.

The transceiver manager may be configured to reduce the polling frequency for each of the transceiver ports by signaling each of the transceiver ports in the set to modify a corresponding frequency with which the transceiver port provides the monitorable data. The communication-intensive operation may comprise a firmware upgrade for a first transceiver connected to the first transceiver port.

Another alternative embodiment comprises a network device the manages transceivers in the device by monitoring a plurality of transceiver ports, determining that a first transceiver port of the plurality of transceiver ports is undergoing a communication-intensive operation on a first bus, determining, during the communication-intensive operation, that a management operation for the first transceiver port is pending, pausing the communication-intensive operation, completing the management operation for the first transceiver port, and resuming the communication-intensive operation after completion of the management operation.

Another alternative embodiment comprises a network device having a transceiver manager and a plurality of management buses connected to the transceiver manager, each management bus being connected to a corresponding transceiver. The transceiver manager is configured to, in response to determining that a first transceiver connected to a first one of the management buses is undergoing a communication-intensive operation, identify a subset of the plurality of management buses other than the first management bus, and reduce a polling frequency for each of the transceivers connected to the subset of management buses from a first polling frequency to a reduced polling frequency. The transceiver manager is also configured to reset the polling frequency of the transceivers connected to the subset of management buses to the first polling frequency in response to determining that the communication-intensive operation has completed.

In some embodiments, the transceiver manager is configured to determine during the communication-intensive operation that a management operation for the first transceiver port is pending, pause the communication-intensive operation, complete the management operation for the first transceiver port, and resume the communication-intensive operation after the management operation for the first transceiver port has been completed. The communication-intensive operation may comprise a firmware upgrade for a first transceiver connected to the first transceiver port. The first bus may comprise a two-wire SMBus.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments disclosed herein will be employed without a corresponding use of other features, and features described with respect to one embodiment may be combined with features of other embodiments without departing from the scope and spirit of the disclosure as set forth.

What is claimed is:

1. A method for managing transceivers in a network device, the method comprising:

determining that a first transceiver port of a plurality of transceiver ports is undergoing a communication-intensive operation on a first bus;

in response to the determining that the first transceiver port is undergoing the communication-intensive operation, identifying a set of transceiver ports other than the first transceiver port connected to the first bus, and reducing a polling frequency for each of the transceiver ports in the set from a first polling frequency to a reduced polling frequency;

determining, during the communication-intensive operation, that a management operation for the first transceiver port is pending;

pausing the communication-intensive operation;

completing the management operation for the first transceiver port;

resuming the communication-intensive operation;

determining that the communication-intensive operation has completed; and in response to the determining that the communication-intensive operation has completed, resetting the polling frequency of the transceiver ports in the set to the first polling frequency.

2. The method of claim 1, wherein the management operation comprises a configuration command for the first transceiver port.

3. The method of claim 1, wherein the management operation comprises an update of monitorable data for the first transceiver port.

4. The method of claim 1, wherein the first bus comprises a two-wire System Management bus (SMBus).

5. The method of claim 1, wherein the plurality of transceiver ports includes transceiver ports connected to a plurality of different buses.

6. The method of claim 1, wherein the communication-intensive operation comprises a firmware upgrade.

7. The method of claim 1, wherein reducing the polling frequency for each of the transceiver ports comprises signaling each of the transceiver ports in the set to modify a corresponding frequency with which the transceiver port provides the monitorable data.

8. A network device comprising:

a management bus;

a plurality of transceiver ports connected to the management bus;

a transceiver manager connected to the management bus;

wherein the transceiver manager is configured to:

in response to determining that a first transceiver port of the plurality of transceiver ports is undergoing a communication-intensive operation on the management bus, identify a subset of the plurality of transceiver ports other than the first transceiver port, and reduce a polling frequency for each of the transceiver ports in the subset from a first polling frequency to a reduced polling frequency;

determine, during the communication-intensive operation, that a management operation for the first transceiver port is pending;

pause the communication-intensive operation;

complete the management operation for the first transceiver port;

resume the communication-intensive operation after the management operation for the first transceiver port has been completed; and in response to determining that the communication-intensive operation has completed, reset the polling frequency of the transceiver ports in the subset to the first polling frequency.

9. The network device of claim 8, wherein the management operation comprises a configuration command for the first transceiver port.

10. The network device of claim 8, wherein the management operation comprises an update of monitorable data for the first transceiver port.

11. The network device of claim 8, wherein the management bus comprises a two-wire System Management bus (SMBus).

12. The network device of claim 8, wherein the plurality of transceiver ports includes transceiver ports connected to a plurality of different buses.

13. The network device of claim 8, wherein the communication-intensive operation comprises a firmware upgrade for a first transceiver connected to the first transceiver port.

14. The network device of claim 8, wherein the transceiver manager is configured to reduce the polling frequency for each of the transceiver ports by signaling each of the transceiver ports in the subset to modify a corresponding frequency with which the transceiver port provides the monitorable data.

15. A network device comprising:

a transceiver manager;

a plurality of management buses connected to the transceiver manager, each management bus being connected to a corresponding transceiver;

wherein the transceiver manager is configured to:

in response to determining that a first transceiver port connected to a first one of the management buses is undergoing a communication-intensive operation, identify a subset of the plurality of management buses other than the first one of the management buses, and reduce a polling frequency for each of the transceivers connected to the subset of management buses from a first polling frequency to a reduced polling frequency;

determine, during the communication-intensive operation, that a management operation for the first transceiver port is pending;

pause the communication-intensive operation;

complete the management operation for the first transceiver port;

resume the communication-intensive operation after the management operation for the first transceiver port has been completed; and in response to determining that the communication-intensive operation has completed, reset the polling frequency of the transceivers connected to the subset of management buses to the first polling frequency.

16. The network device of claim 15, wherein the first one of the management buses comprises a two-wire System Management bus (SMBus).

17. The network device of claim 15, wherein the communication-intensive operation comprises a firmware upgrade for a first transceiver connected to the first transceiver port.

\* \* \* \* \*